(12) United States Patent
Gruet et al.

(10) Patent No.: US 9,374,825 B2
(45) Date of Patent: Jun. 21, 2016

(54) METHOD FOR ESTABLISHING A TRANSMISSION BETWEEN MOBILE TERMINALS OF THE SAME GROUP PERTAINING TO A SHARED-RESOURCE RADIOCOMMUNICATION NETWORK OPERATING IN A DIRECT MODE

(71) Applicant: Cassidian SAS, Elancourt (FR)

(72) Inventors: Christophe Gruet, Montigny le Bretonneux (FR); Laurent Pison, Jouars Ponchartrain (FR); Eric Georgeaux, Montigny le Bretonneux (FR)

(73) Assignee: CASSIDIAN SAS, Elancourt (FR)

( * ) Notice: Subject to any disclaimer, the term of this patent is extended or adjusted under 35 U.S.C. 154(b) by 0 days.

(21) Appl. No.: 14/407,871

(22) PCT Filed: Jun. 11, 2013

(86) PCT No.: PCT/FR2013/000149
§ 371 (c)(1),
(2) Date: Dec. 12, 2014

(87) PCT Pub. No.: WO2013/186448
PCT Pub. Date: Dec. 19, 2013

(65) Prior Publication Data
US 2015/0173061 A1 Jun. 18, 2015

(30) Foreign Application Priority Data
Jun. 15, 2012 (FR) ...................................... 12 01723

(51) Int. Cl.
*H04W 72/00* (2009.01)
*H04W 72/04* (2009.01)
(Continued)

(52) U.S. Cl.
CPC ........... *H04W 72/048* (2013.01); *H04L 5/0032* (2013.01); *H04W 4/08* (2013.01); *H04W 72/085* (2013.01); *H04W 74/0891* (2013.01); *H04L 5/0091* (2013.01); *H04W 72/082* (2013.01); *H04W 76/005* (2013.01); *H04W 88/06* (2013.01)

(58) Field of Classification Search
CPC ... H04W 72/048; H04W 4/08; H04W 72/085; H04W 74/0891; H04W 88/06; H04W 76/005; H04W 72/082; H04L 5/0032; H04L 5/0091
USPC ...................................................... 455/452.2
See application file for complete search history.

(56) References Cited

U.S. PATENT DOCUMENTS

| | | | |
|---|---|---|---|
| 6,118,771 A * | 9/2000 | Tajika | H04L 12/185 370/328 |
| 6,529,486 B1 * | 3/2003 | Barnes | H04W 84/08 370/327 |

(Continued)

OTHER PUBLICATIONS

International Search Report for PCT/FR2013/000149 dated Aug. 16, 2013 (6 pages).

*Primary Examiner* — Juan A Torres
(74) *Attorney, Agent, or Firm* — Gardere Wynne Sewell LLP; Andre M. Szuwalski

(57) ABSTRACT

A transmission of information is established between an emitting mobile terminal and at least one receiving mobile terminal of the same group of terminals pertaining to a shared-resource radiocommunication network operating in a direct mode includes the step of emitting by the emitting terminal of a transmission request to inform the other receiving terminals of the group of its intention to transmit information. Each receiving terminal of the group then determines whether, on the basis of at least one pre-defined selection strategy, it will accept the transmission of information. If it will, the receiving terminal transmits a return signal comprising data relating to the emitting terminal to the other terminals of the group. Then, the emitting terminal checks whether it respects the transmission conditions. If it does, the emitting terminal transmits the information to the other terminals in its group via at least one resource allocated to the group.

15 Claims, 4 Drawing Sheets

(51) Int. Cl.
*H04L 5/00* (2006.01)
*H04W 74/08* (2009.01)
*H04W 4/08* (2009.01)
*H04W 72/08* (2009.01)
*H04W 76/00* (2009.01)
*H04W 88/06* (2009.01)

(56) References Cited

U.S. PATENT DOCUMENTS

2009/0016317 A1    1/2009   Wu et al.
2009/0019173 A1    1/2009   Wu et al.
2011/0105065 A1    5/2011   Sampath et al.

* cited by examiner

METHOD FOR ESTABLISHING A TRANSMISSION BETWEEN MOBILE TERMINALS OF THE SAME GROUP PERTAINING TO A SHARED-RESOURCE RADIOCOMMUNICATION NETWORK OPERATING IN A DIRECT MODE

TECHNICAL FIELD

This invention relates to the establishment of transmission of information between an emitting mobile terminal and receiving mobile terminals of the same group of terminals belonging to a trunked radiocommunications network, wherein the network operates in direct mode and comprises a plurality of mobile terminals organized in groups.

BACKGROUND

The use of a PMR (Professional Mobile Radio) trunked narrowband land radiocommunications network, for example of the DMR (Digital Mobile Radio) or TETRA (Terrestrial Trunked Radio) type, for critical public security mission services is known.

Bringing together fixed and mobile terminals in groups in the PMR professional mobile radio network so that any terminal that is a member of a group can transmit voice data or sometimes short messages at higher speeds to the other terminals who are members of the group through the network and receive data from any other terminal belonging to the group is also known. Fixed and mobile terminals of a same group can only communicate with each other. Trunking in a base station of the professional mobile radio network is carried out in the form of channels where the number and speeds are determined to securely meet the need for communication and radio coverage resources of the mobile terminals.

Further, in a particular asynchronous operating mode called DMO (Direct Mode of Operation), the mobile terminals of the same group communicate directly with each other without going through a base station of the trunked radiocommunications network. Thus, in the DMO mode, no base station or repeater is used, but the range is limited to a few hundred meters. This mode makes it possible to communicate in areas outside radio coverage (for example in underground parking lots).

In such trunked radiocommunications network operating in DMO mode, each frequency channel—allocated to a group of terminals—is independent, at least from the viewpoint of synchronization, of the other channels. Thus, synchronization is only between the terminals of the same channel. The usage frequencies of each channel are determined in advance. Only the start times of frames and the sequencing of frames are synchronous and managed for each group.

When such a channel is allocated, any terminal of a group can use the resource at any time, which means that a protocol must be used to monitor and detect collisions. In the event of a collision, the message is repeated on the channel at the end of a random time. Monitoring of collisions requires arbitration.

Thus, when frequency channels exist and are specifically dedicated to the DMO operating mode in a trunked narrowband radiocommunications network operating in DMO mode, that mode requires the management, monitoring and detection of collisions, and thus has a lower useful speed.

SUMMARY

This invention is aimed at remedying those drawbacks and particularly allowing the establishment of transmission of information between an emitting mobile terminal and at least one receiving mobile terminal of a trunked radiocommunications network operating in direct mode with no risk of collision.

To that end, according to this invention, the method for the establishment of transmission of information between an emitting mobile terminal and at least one receiving mobile terminal of the same group of terminals belonging to a trunked radiocommunications network, wherein the network operates in direct mode and comprises a plurality of mobile terminals organized in groups, is remarkable in that:

E1/ at least one terminal of a given group of terminals of said network, known as the first emitting terminal, emits a transmission request to inform the other terminals of said group of its intention to transmit information with the help of resources allocated to its group, or even resources allocated to other groups;

E2/ at least some of the other terminals of said group monitor the emission of such a transmission request;

E3/ each terminal of said group that has received said transmission request, known as a receiving terminal, determines whether it accepts the transmission of information by said first emitting terminal, on the basis of at least one predefined selection strategy;

E4/ if said transmission is accepted, each receiving terminal sends to the other terminals of its group a return signal comprising data relating to said first emitting terminal, particularly its identity;

E5/ after reception of said return signal, said first emitting terminal verifies if it fulfils predetermined conditions for transmission; and E6/ if said conditions for transmission are fulfilled, said first emitting terminal transmits said information to the other terminals in its group through at least one resource allocated to said group.

Thus, thanks to the invention, the management of communications between terminals in a same group of a trunked radiocommunications network operating in direct mode is improved. For transmission to be established between an emitting terminal and receiving terminals of the same group, conditions for transmission must be fulfilled, so as to reduce the risk of collisions and optimize the quality and speed of the transmission of information between those terminals.

Further, in a step prior to step E6, said first emitting terminal can receive notifications from terminals that do not belong to said group in question, from which it can determine the availability of the resources allocated to groups other than said group.

Further, according to said predefined strategy implemented in step E3, each receiving terminal of said group can:

determine the signal-to-noise ratio expected for transmission from said first emitting terminal;

compare the signal-to-noise ratio thus determined with a first threshold ratio; and accept the transmission of information that said first emitting terminal wishes to carry out, when the signal-to-noise ratio determined is at least equal to said first threshold ratio.

Thus the transmission of information from an emitting terminal can only be envisaged if the quality of the transmission is adequate.

Further, when at least one other emitting terminal of said group, known as the second emitting transmitter, also wishes to simultaneously transmit information to other terminals of said group, each receiving terminal can, depending on the predefined selection strategy implemented in step E3:

determine the signal-to-noise ratio expected for transmission from a second emitting terminal;

compare the signal-to-noise ratio thus determined with said first threshold ratio;

verify that at least one additional selection criterion is validated; and accept the transmission of information from the first emitting terminal when the corresponding expected signal-to-noise ratio is at least equal to said first threshold ratio and said additional criterion is validated.

As examples, said additional selection criterion may belong to the following group of criteria:

if a terminal priority strategy is put in place in said group, the priority of the first emitting terminal is higher than that associated with the second emitting terminal, or even other emitting terminals of said group that wish to transmit;

the determined signal-to-noise ratio corresponding to the first emitting terminal is greater than that corresponding to the second emitting terminal, or even the other emitting terminals of said group that wish to transmit.

Preferably, prior to step E4, each receiving terminal of said group that has accepted transmission from the first emitting terminal:

determines the signal-to-interference ratio expected for transmission from the first emitting terminal from which transmission of information is accepted;

compares the signal-to-interference ratio determined in that manner with a second threshold ratio, preferably equal to said first threshold ratio; and indicates in its return signal:

when the determined signal-to-interference ratio is at least equal to said second threshold ratio, that it authorizes the transmission of information simultaneously through the resource allocated to said group by an emitting terminal of said group other than said first emitting terminal;

when the determined signal-to-interference ratio is below said second threshold ratio, that it refuses the transmission of information simultaneously through the resource allocated to said group by an emitting terminal of said group other than said first emitting terminal.

Thus, when a parallel transmission of another emitting terminal is liable to hinder the reception of a receiving terminal that has accepted reception from the first emitting terminal, the receiving terminal in question asks for the cancellation of the parallel transmission.

Further, during the verification step E5, said first emitting terminal can:

calculate a ratio R1 defined by the following relation:

$$R1 = \frac{N_{OK}}{N_{OK} + N_{KO}}$$

where:

$N_{OK}$ is the number of receiving terminals of said group that have accepted the transmission of information from the first emitting terminal;

$N_{KO}$ is the number of receiving terminals that have refused the transmission of information from the first emitting terminal and have accepted the transmission of information from another emitting terminal of said group;

calculate a ratio R2 defined by the following relation:

$$R2 = \frac{N_{OK} + N_{KO}}{N_{Total}^{DMOGroup\#k}}$$

where $N_{Total}^{DMOGroup\#k}$ number of terminals of said group;

compare the ratios R1 and R2 with a first threshold and a second threshold respectively; and decide that said conditions for transmission are fulfilled when the ratios R1 and R2 are above the first and second thresholds respectively.

Preferably, a terminal priority strategy is defined in said group, so that said first emitting terminal:

verifies if, out of the receiving terminals that have refused to receive information from it, at least one has priority higher than that of the receiving terminals that have accepted transmission from said first emitting terminal; and decides that said conditions for transmission are fulfilled when the receiving terminals that have refused to receive information from it do not have priority higher than that of the receiving terminals that have accepted the transmission.

Besides, the request for transmission preferably comprises the identity of the first emitting terminal, its intention to start transmitting information and the resources allocated to other groups of said network through which the first emitting terminal wishes to transmit information. Of course, the request for transmission may comprise additional information such as the duration of the requested transmission.

Also preferably, according to the invention:

the first emitting terminal receives data about the availability of the resources allocated by default to other groups that it wishes to use for its transmission of information; and in the step E6/, the first emitting terminal transmits information through the resource allocated by default to its group and through the resources required from other groups that are available.

Thus, the allocation of additional resources belonging to groups other than that of the first emitting terminal makes it possible to improve the data speed, while preventing the disruption of communication of groups whose resources are used or requested.

Advantageously, when said conditions for transmission are fulfilled, said first emitting terminal, which has decided to transmit information to the other terminals of its group, can implement an optimization strategy corresponding to a power adaptation and/or adaptation of the modulation and coding scheme.

Besides, this invention also relates to a mobile terminal belonging to a trunked radiocommunications network, which operates in direct mode and comprises a plurality of mobile terminals organized in a group.

According to the invention, said mobile terminal comprises:

means to emit a transmission request in order to inform the other terminals in its group of its intention to transmit information to them;

means to monitor the emission of a transmission request from emitting terminals of its group;

means to determine, on the basis of at least one predefined selection strategy, if it accepts the transmission of information from an emitting terminal of its group from which it has received a transmission request;

means to transmit a return signal to the other terminals of its group comprising data relating to an emitting terminal from which it has accepted the transmission of information;

means to verify, in the event of reception of a return signal from at least one receiving terminal of its group, if it fulfils the predetermined conditions for transmission; and means to transmit information to the other terminals of its group through at least one resource allocated to said group, in case said conditions for transmission are fulfilled.

Further, said mobile terminal of the invention may also comprise:

means to monitor the emission of a transmission request from emitting terminals that do not belong to its group;

means to monitor notifications relating to the use of resources allocated to groups other than its own from receiving terminals that do not belong to its group;

means to determine, on the basis of at least one predefined auxiliary selection strategy, if the resources allocated to a group other than its own can be used to transmit information to the other terminals in its group; and means to transmit a return signal to emitting terminals that do not belong to its group and have indicated their intention to use the resources of its group, to inform them that these resources are not available.

This invention also relates to a trunked radiocommunications network operating in direct mode and comprising a plurality of mobile terminals organized in a group, wherein said mobile terminals are capable of implementing the method described earlier.

BRIEF DESCRIPTION OF THE DRAWINGS

The figures of the attached drawing will make the invention clear. In these figures, identical references are used to designate similar elements.

DETAILED DESCRIPTION

Figure 1:
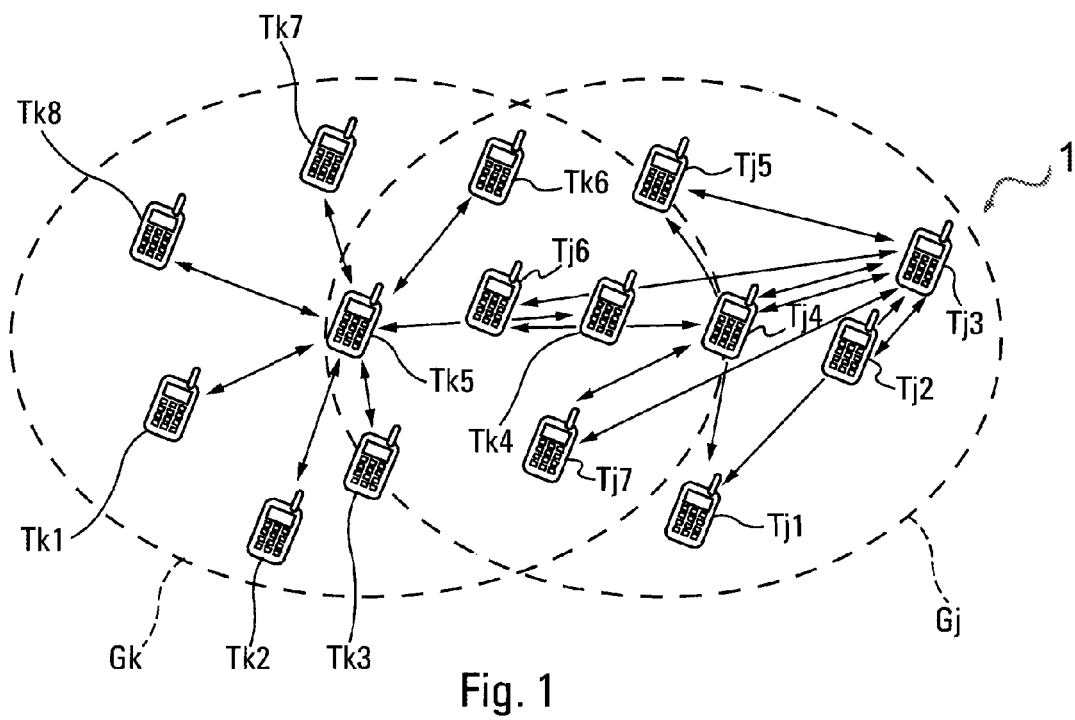
FIG. 1 is a schematic illustration of an example of a trunked radiocommunications network operating in direct mode, in accordance with this invention.

FIG. 1 contains a representation of a trunked radiocommunications network 1 operating in direct mode (for example a narrowband network) comprising a plurality of identical mobile terminals Tki distributed into several groups Gk (where k and i are integers representing the group number and the number of the relevant terminal of that group respectively). Thus, in DMO mode, each mobile terminal Tki of a group Gk can transmit data to other terminals in its group by implementing the DMO mode transmission method according to the invention, described below.

In the example illustrated in FIG. 1, the network 1 comprises six distinct groups Gk, each formed of twenty-four mobile terminals (corresponding to twenty-four different users). Of course, as an alternative, the number of groups and the number of terminals in each group may be different.

For the sake of clarity, only two groups Gk and Gj (j≠k) and a few terminals Tk1 to Tk8 and Tj1 to Tj7 belonging to these two groups are represented in FIG. 1.

Subsequently, each mobile terminal, Tki, Tji can operate alternatively for emission or reception.

According to the DMO method of the invention, a single frequency channel ΔFk is allocated by default to each group Gk, Gj of the network 1.

Figure 2:
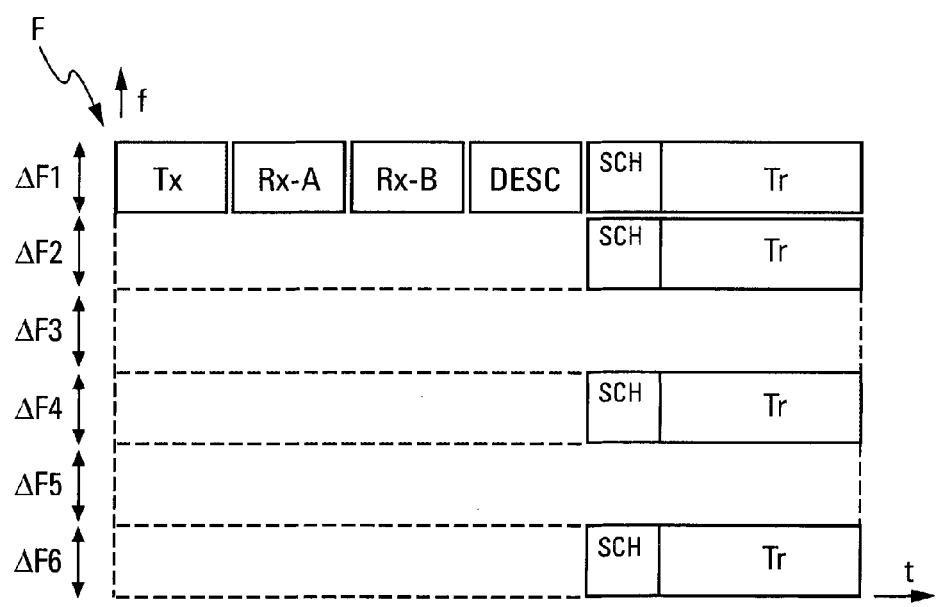
FIG. 2 is a time and frequency diagram of a frame in accordance with the DMO method of the invention.

Further, as illustrated in FIG. 2, each radio frame F in accordance with the DMO method of the invention implemented in network 1 comprises:

a transmission block Tx, with a structure that allows one or more terminals Tki of a given group Gk—which wish to emit—to announce their intention to transmit. Such terminals are called emitting terminals below;

a first reception block Rx-A, with a structure that allows the terminals Tki—which do not intend to transmit data (called receiving terminals)—of the group Gk in question to send back, particularly to the emitting terminal Tki of said group Gk, their perception of the future transmission requested by the latter;

a second reception block Rx-B, with a structure that allows the receiving terminals Tji of the other groups Gj to indicate, particularly to the emitting terminals Tki of the group Gk in question, their perception of the future transmission requested by the latter; and a description block DESC, with an associated structure that makes it possible to describe the future transmission and particularly the frequency channel or channels used, the MCS (Modulation and Coding Scheme) implemented and the length of an associated traffic block Tr. The modulation used by default (for example QPSK1/3) is determined so as to allow the management of groups of terminals in a wide geographic area. However, as described subsequently, the MCS scheme can, on some conditions, be modified by the emitting terminal;

a synchronization block SCH comprising an associated synchronization word; and the traffic block Tr comprising the information to transmit to the other terminals Tki of the group Gk in question.

In particular, each frame F comprises two distinct parts, namely:

a first part dedicated to the negotiation of transmission, which is made up of the blocks Tx, Rx-A, Rx-B and DESC; and a second part dedicated to the transmission of information, which is formed of blocks SCH and Tr.

In FIG. 2, for the same frame F, other blocks SCH and Tr are represented and symbolize the temporary use of the frequency channels ΔFj allocated to other groups Gj, but used by the group Gk in question. The details of such use are described below.

Figure 3:
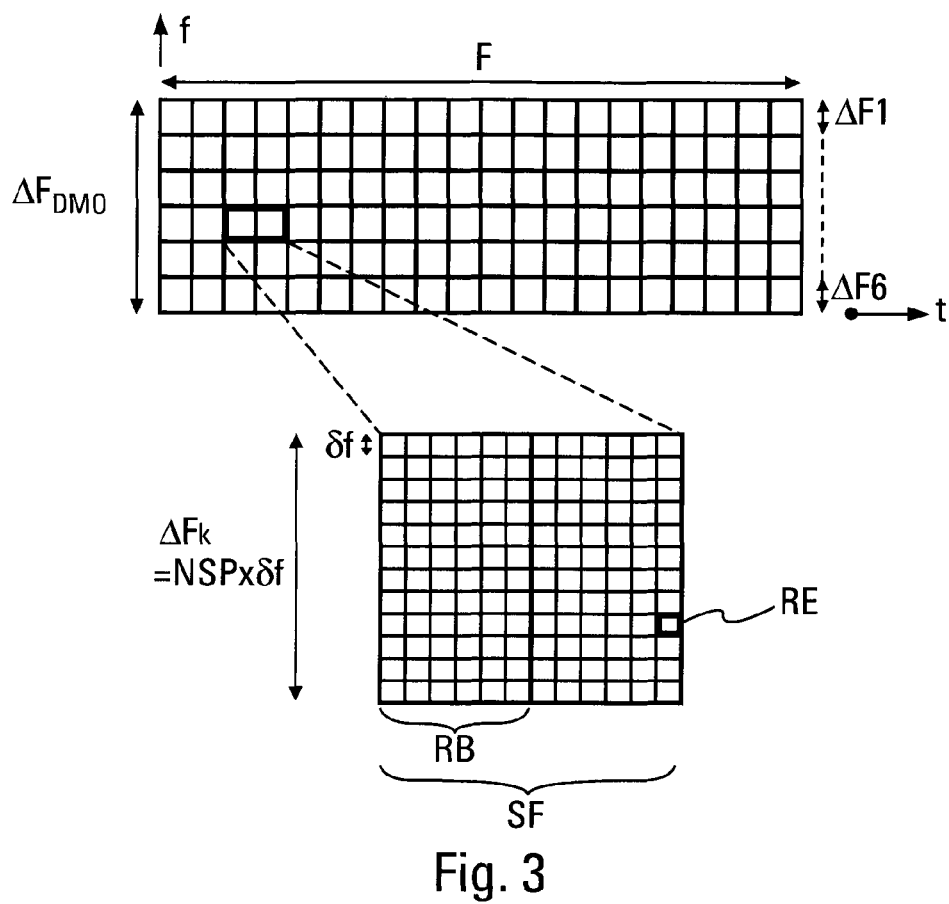
FIG. 3 describes an example of a structure, in time and frequency, of the frame of FIG. 2.

Besides, as shown more precisely in FIG. 3, each frequency channel ΔFk, ΔFj is divided into a predefined number NSP of sub-carriers with a width δf.

In particular, in one example of embodiment, each radio frame F, in accordance with the DMO method of the invention, comprises ten sub-frames SF each comprising two resource blocks RB distributed consecutively in time.

Each resource block RB comprises $NS_{RB} \times NSP$ radio resource elements RE distributed over $NS_{RB}$ consecutive symbol periods Ts and NSP sub-carriers.

When NSP=12 and δf=15 kHz, the total frequency band allocated to the network 1 is equal to 6. ΔFk, or 1,080 MHz. The symbol period Ts is equal to 83.3 μs, and so the duration of a radio frame F is 10 ms.

Each of the blocks Tx, Rx-A, Rx-B, DESC, SCH and Tr of a frame F is formed of one or more sub-frames SF and thus has a duration that is a multiple of the duration of a sub-frame SF (1 ms).

The processing of the transmission blocks Tx and reception blocks Rx-A and Rx-B of a frame F is carried one resource element RE after another, according to the principle of ON/OFF detection. On the other hand, for the processing of the data blocks SCH and Tr, the transmission standard LTE-OFDM is implemented as an example. Thus, when information is transmitted, the emitting terminal Tki plays the part of the base station of an LTE network and uses signaling and transmission that are based, for example, on a Physical Downlink Control Channel (PDCCH).

Figure 5:
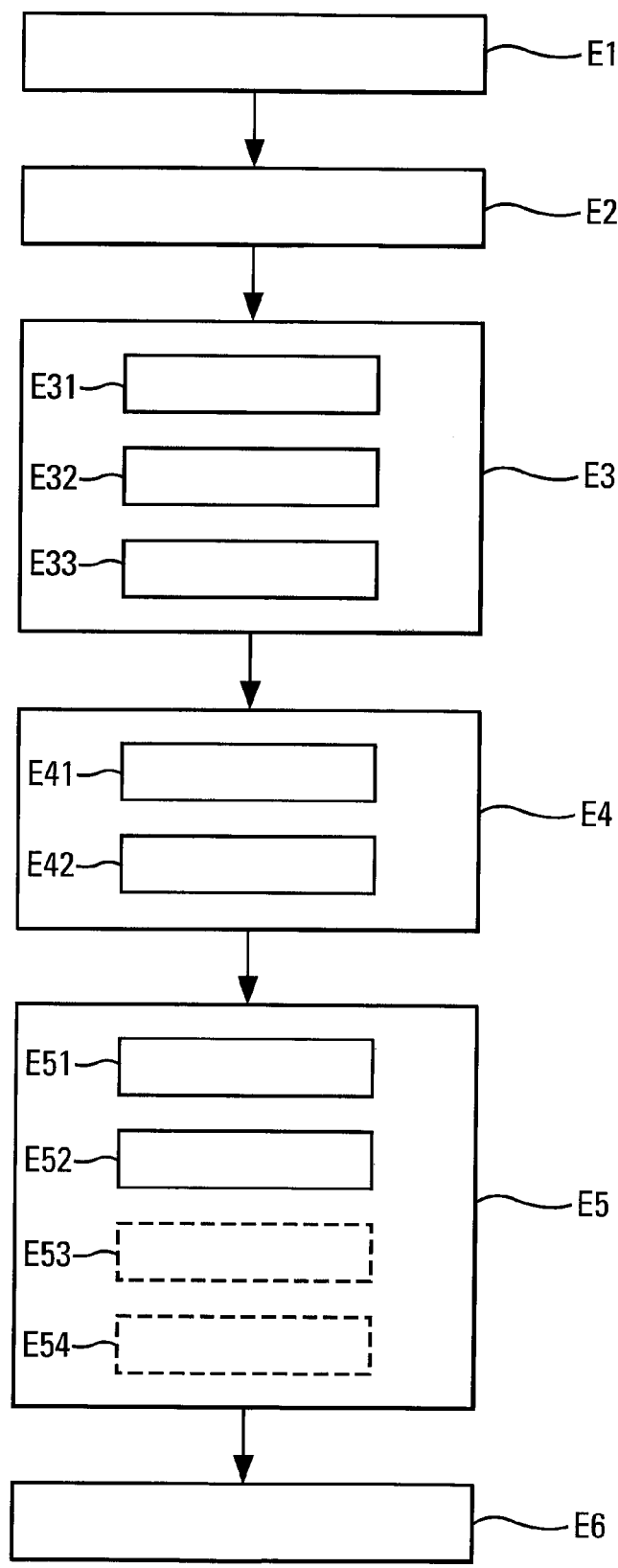
FIG. 5 illustrates the various steps implemented to establish transmission in accordance with the method of the invention between an emitting terminal and receiving terminals of a given group of the network of FIG. 1.
Figure 6:
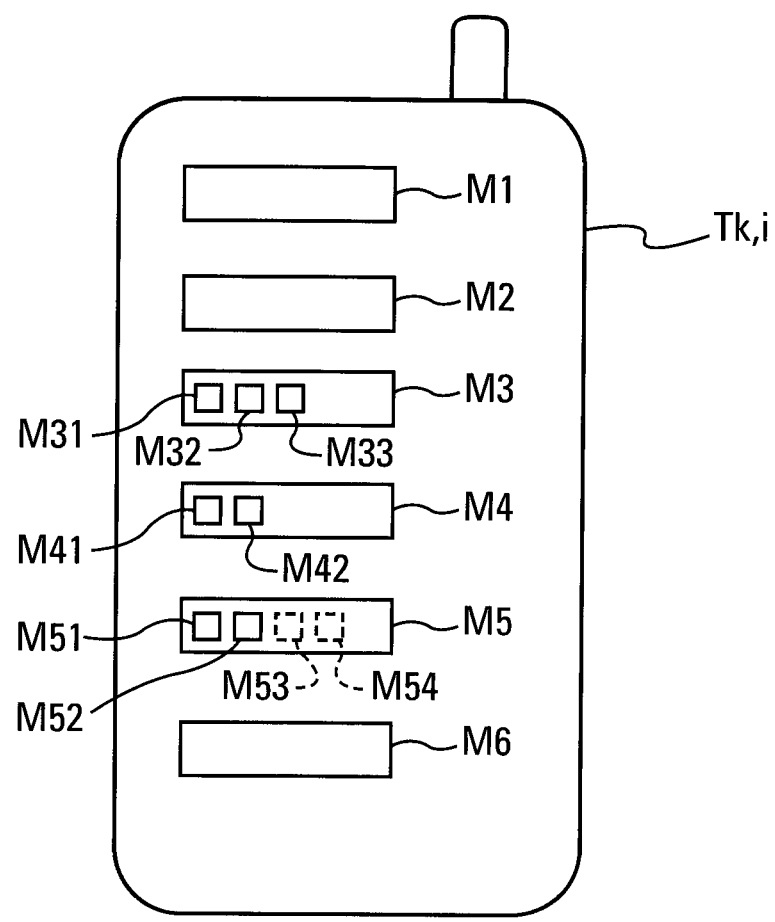
FIG. 6 is a schematic representation of a mobile terminal of the network of FIG. 1.

As shown in FIG. 5, the method for establishing the transmission of information within the group Gk comprises, according to the invention, a first step E1 in which one or more emitting terminals Tki of the relevant group Gk emit, through means M1 (FIG. 6) a transmission request to inform the other terminals Tki of the group Gk of their intention to transmit information.

The transmission intentions of the emitting terminals Tki of the group Gk, which take the form of transmission intention words, are assembled in the transmission block Tx associated with the group Gk, with which the frequency channel ΔFk is allocated by default. The transmission request emitted by an emitting terminal Tki of the group Gk particularly comprises its transmission intention word.

Figure 4:
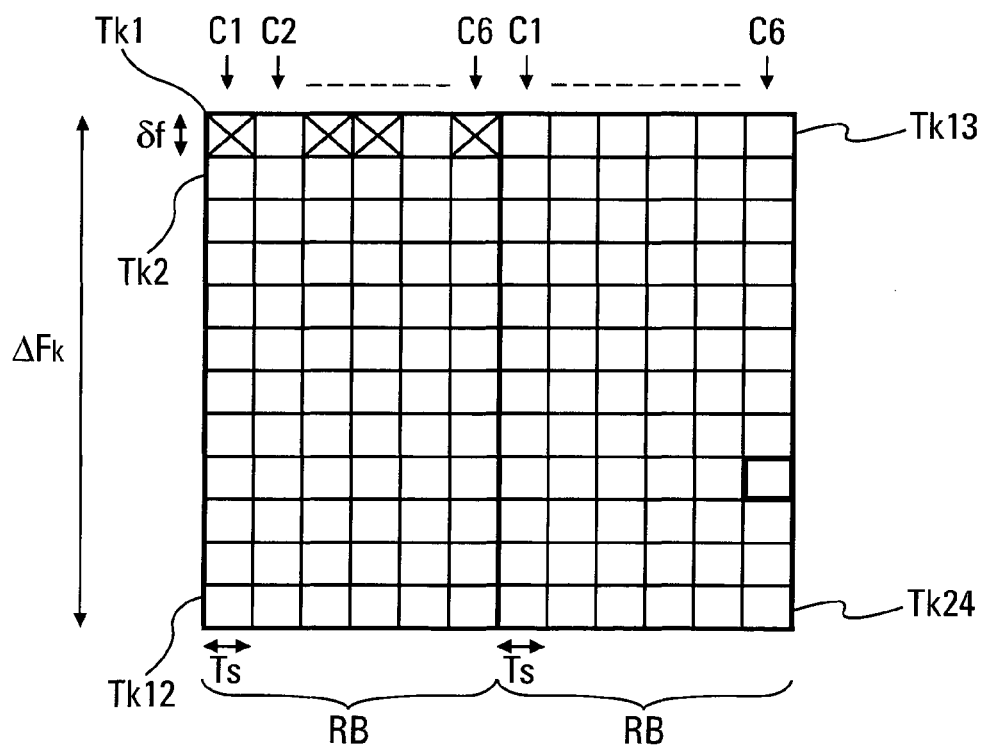
FIG. 4 is a time and frequency diagram representing an example of the transmission block implemented in the DMO method of the invention.

As shown in the example of FIG. 4, the structure of the transmission block Tx associated with the group Gk on the channel ΔFk comprises two resource blocks RB that are consecutive in time. A sub-structure formed of six consecutive resource elements RE belonging to the same resource block RB is associated with each terminal Tki (representing a user of the group Gk). In other words, each terminal Tki of the group Gk is allocated six consecutive resource elements RE.

Since the transmission block Tx comprises two consecutive resource blocks RB, each comprising $NS_{RB} \times NSP$ radio resource elements RE distributed over six consecutive symbol periods Ts and twelve sub-carriers δf, each resource block RB represents twelve different terminals Tki (wherein the same sub-carrier 8f of the channel ΔFk is allocated consecutively to a terminal of the group Gk during the six periods Ts of the first resource block RB and to another terminal of said group Gk during the six subsequent periods Ts of the second resource block RB).

The resource elements RE of a resource block RB associated with a same symbol period Ts each represent the transmission intention of a terminal Tki of the group Gk on a given frequency channel ΔFk, ΔFj. In particular, the first column C1—formed of twelve resource elements RE of the transmission block Tx—is associated with the first channel ΔF1 allocated by default to the group G1, the second column C2 is associated with the second channel ΔF2 allocated by default to the group G2 etc.

Thus, the twenty-four terminals Tki of the group Gk in question can formulate their intention to transmit through network 1, and the additional channel or channels ΔFj that they wish to use for their transmission, by emitting a symbol in the appropriate resource element RE of the corresponding column. The six resource elements RE allocated to each of the terminals Tki of the group Gk define the transmission intention word of that terminal in six bits.

All the transmission intention words of terminals Tki of the same group form the transmission block Tx associated with that group.

It can be understood that the frequency channel allocated by default to a group is preferably used on a priority basis.

If the volume of data to transmit requires more bandwidth, an emitting terminal Tki of the group Gk can use additional channels ΔFj allocated to the other groups Gj, providing no activity is detected on these other groups.

As indicated above, each transmission block Tx is processed according to the principle of ON/OFF detection determining the presence of a symbol in a given resource element RE.

As an alternative, other structures of the transmission block Tx can of course be envisaged, particularly to improve the SNR ratio, but they require more resource blocks RB and/or the implementation of additional protection (for example the use of convolutional code).

As an example, the structure of the transmission block Tx may reuse part of the structure of a signal transmitted in an LTE broadband radiocommunications network. In particular, the transmission block Tx may implement:

Primary Synchronization Signal (PSS) channels and Secondary Synchronization Signal (SSS) channels. For example, the unique identity of each terminal of a network group 1, equivalent to the identity of a physical cell in an LTE downward frame, may be transmitted by the primary synchronization signal PSS and secondary synchronization signal SSS channels. Thus, when the identities of the terminals of different groups of network 1 are known to each terminal, each terminal can identify the emitting terminal and the associated group via the reception of PSS and SSS channels; and a PBCH (Physical Broadcast Channel), which may be used to transmit the transmission intention word of an emitting terminal.

In a second step, E2, of the DMO method according to the invention, the receiving terminals Tki of the group Gk—which do not wish to emit—monitor, through their respective means M2, the emission of transmission requests by the emitting terminals of the group.

In that way, each of the receiving terminals Tki of the group Gk in question knows the transmission intentions of the emitting terminals of its own group.

It may be noted that the receiving terminals Tki of the group Gk may also monitor the emission of transmission requests from emitting terminals Tji belonging to other groups Gj of the network 1. Thus, depending on their geographical position, some receiving terminals Tki of the group Gk are capable of detecting:

transmission conflicts in their own group Gk (for example two emitting terminals Tki wish to emit simultaneously on the same channel ΔFk);

conflicts between groups (for example when an emitting terminal Tki of the group Gk asks for the use of an additional channel ΔFj, which has been required by the group Gj to which that channel has been allocated by default).

In particular, because each emitting terminal Tki of the group Gk transmits its transmission intention word using the predefined transmission power P0, each receiving terminal Tki is capable of determining the presence or absence of a transmission intention by detecting each transmission intention word of a given block Tx.

Such detection implements the evaluation of the power received $P_r^{Tx\#k}$ by each receiving terminal, with the help of means M2, for each symbol of the transmission intention word of an emitting terminal of the network 1. When the power received $P_r^{Tx\#k}$ by that receiving terminal is below a predefined threshold power, then it is considered that no symbol has been transmitted.

In a third step E3 of the method in the invention, each receiving terminal Tki of the group Gk—which has received one or more transmission requests—determines, on the basis of at least one predefined selection strategy detailed below and with the help of means M3, if it accepts or refuses the transmission of information and indicates, if transmission is accepted, the emitting terminal Tki of the its group Gk selected to carry out the transmission.

In particular, depending on the predefined selection strategy, each receiving terminal Tki of said group Gk determines with the help of means M31 belonging to means M3, in a first sub-step E31, the signal-to-noise ratio SNR expected for transmission from the emitting terminal or terminals of its group Gk, from which it has received the transmission request.

The signal-to-noise ratio SNR expected is accessible from the relation $$SNR = \frac{P_r^{Tx\#k}}{Pthermal},$$

by considering that the channel allocated to the relevant group Gk is only used by a single emitting terminal.

Then, in a second sub-step E32, each receiving terminal of the group Gk compares, with a predefined threshold ratio γ, the expected SNR ratios determined for each emitting terminal Tki of said group Gk, with the help of means M32 belonging to the means M3.

In a third sub-step E33, each receiving terminal Tki of the group Gk verifies, with the help of means M33 belonging to means M3, if at least one additional selection criterion is validated for each emitting terminal of said group Gk detected.

As an illustrative and non-limitative example, the following selection criteria may be implemented as part of this invention:
  when a priority strategy of the terminals Tki is implemented in the group Gk (in other words, the terminals Tki are prioritized by importance within the group Gk), the priority of the emitting terminal Tki in question is higher than that associated with the other emitting terminals Tki of the group Gk. Thus, an emitting terminal Tki that does not have the highest SNR ratio can still be selected by a receiving terminal Tki depending on its priority;
  the expected signal-to-noise ratio SNR determined for the emitting terminal Tki in question is greater than that determined for the other emitting terminals Tki of the group Gk.

As a remark, it may be noted that the priority of the terminals of the same group can be updated periodically or deliberately. Such updating may only apply to a determined part of the terminals of the group and not to all the terminals (for example so that some terminals always have the same priority).

Thus, in the third step E3, each receiving terminal accepts the transmission of information from the emitting terminal Tki of the group Gk with a corresponding expected signal-to-noise ratio SNR that is at least equal to the threshold ratio γ and where the additional selection criteria are validated.

It can be understood that if only one emitting terminal Tki has been detected by a receiving terminal Tki, the additional selection criterion or criteria are automatically validated. Further, in that case, if the expected SNR ratio is below the threshold ratio γ, the receiving terminal in question refuses the transmission, even if no other transmission is planned by other emitting terminals of said group.

It must be noted that the threshold ratio γ is the minimum signal-to-noise ratio SNR required for the future transmission, considering that the most rugged modulation and coding scheme MCS will be used by the selected emitting terminal.

When it accepts transmission from an emitting terminal Tki of the group Gk, each receiving terminal Tki transmits, in a fourth step E4, through transmission means M4, a return signal to the other terminals Tki of its group Gk, which comprises data relating to the emitting terminal Tki, the transmission of information by which it has accepted.

Prior to the emission of that return signal, if there is a plurality of emitting terminals Tki in the group Gk, each receiving terminal Tki of the group Gk—that has accepted transmission from a given emitting terminal Tki—determines, in a first additional sub-step E41 using means M41 belonging to the means M4, the Signal to Interference plus Noise Ratio (SINR) expected for a transmission from that selected emitting transmitter Tki.

The signal to interference ratio SINR can be obtained from the relation $$SINR = \frac{P_r^{Tx\#k}}{Pi + Pthermal},$$

where Pi is the interference power and $P_{thermal}$ is the power of thermal noise.

In a second sub-step E42, each receiving terminal Tki of the group Gk compares the signal-to-interference ratio SINR thus determined with the threshold ratio γ, using means M42 belonging to the means M4.

Each receiving terminal Tki of the group Gk indicates, in its return signal:
  when the associated SINR report determined is at least equal to the threshold ratio γ, and authorizes the transmission of information simultaneously on the frequency channel ΔFk allocated to said group Gk by an emitting terminal Tki of its group Gk other than the emitting terminal Tki selected by it;
  when the determined SINR ratio is less than the threshold ratio γ, and refuses all simultaneous parallel transmission on the frequency channel ΔFk from another emitting terminal Tki of the group Gk. In other words, the receiving terminal Tki in question asks the other emitting receiving terminals Tki of its group Gk, from which it has refused transmission, to not emit at the same time as the emitting terminal Tki selected by it.

Thus, the return signal emitted by each receiving terminal Tki of the group Gk may particularly comprise:
  the identity of the emitting terminal Tki of the group Gk from which it accepts the transmission of information. If a priority strategy is implemented in that group Gk, the identity may indicate the priority of the selected emitting terminal Tki;
  the status of the channel ΔFk allocated to said group Gk to indicate, in the event of a plurality of emitting terminals Tki, the refusal or authorization to emit by these emitting terminals simultaneously with the transmission of the receiving terminal Tki selected by the receiving terminal Tki in question. It must be noted that any parallel transmission may be refused by default when more than two emitting terminals Tki are detected by the receiving terminal Tki in question;
  the frequency channel or channel ΔFk through which the emitting terminal Tki selected by it wishes to emit.

Thus, the return signal of each receiving terminal Tki of the group Gk can be integrated in the first reception block Rx-A.

In particular, in an example of embodiment, the structure of the first reception block Rx-A comprises four resource blocks RB that are consecutive in time. In each resource block RB, a sub-structure made up of twelve resource elements RE corresponding to two lines of six consecutive resource elements RE is defined, wherein each line is associated with a sub-porter δf of the channel ΔFk allocated to the group Gk. The return signal thus takes the form of a return word of twelve resource elements RE, or twelve bits, when the ON/OFF detection principle is implemented for processing a first reception block Rx-A. It has a duration of 2 ms and allows all the terminals of the group Gk to report their perception of the transmissions requested.

In particular, the return word from each receiving terminal Tki of the group Gk comprises:
- a resource element RE designed to indicate the status of the channel ΔFk of the group Gk;
- five resource elements RE allocated to the identity of the emitting terminal Tki selected by the receiving terminal Tki; and
- six resource elements RE for indicating the channel or channels ΔFk, ΔFj through which the selected emitting terminal Tki wishes to emit.

Of course, other more elaborate structures of the return word may be envisaged, but they require more bandwidth. As an example, the structure of the first reception block Rx-A may reuse part of the structure of a signal implemented in an LTE broadband radiocommunications network. In particular, the first reception block Rx-A may use a PUCCH (physical uplink control channel) in format 2 dedicated to the sequencing of resources and the discharging of requests, when the structure of the frame is already known to the terminals Tki. Twenty bits may be used for the implementation of a PUCCH channel in a pair of resource blocks (forming a sub-frame SF). Thus, one or more PUCCH sub-frames may be required to support the identity of the emitting terminal Tki selected by a receiving terminal Tki of the group Gk, the status of the channel ΔFk of the group Gk, and the channel or channels on which the selected emitting terminal wishes to emit.

Besides, by correctly selecting the emitting power for each receiving terminal Tki of the group Gk, it is possible in the event of a plurality of emitting terminals Tki in the group Gk, to report to the other emitting terminals Tki the SINR ratio associated with a relevant emitting terminal Tki.

More precisely, if a receiving terminal Tki and two emitting terminals Tki of the group Gk are considered, one of which has been accepted by the receiving terminal Tki and the other has been refused, according to a first power strategy, the receiving terminal Tki emits its return signal with a power P0 identical to that emitted by the emitting terminals Tki, so that the power received by the latter is equal to $\alpha_i P0$, where $\alpha_i$ is the attenuation factor of the corresponding transmission path. In other words, the emitting terminals Tki are informed of the signal-to-noise ratio SNR associated with their future transmission.

In a second power strategy, the receiving terminal Tki emits its return signal with power $P1=K/(\alpha_0 P0)$ where K is a predefined constant factor and $\alpha_0$ represent the attenuation factor of the transmission path between the receiving terminal Tki and the selected emitting terminal Tki. Thus, the power received by the refused emitting terminal Tki is equal to $(\alpha_1/\alpha_0)(K/P0)$ where $\alpha_1$ represents the attenuation factor of the transmission path between the receiving terminal Tki and the refused emitting terminal Tki. Since K and P0 are known, the ratio $(\alpha_0/\alpha_1)$ is accessible and corresponds to the signal to interference ratio SINR felt by the receiving terminal Tki for transmission from the selected emitting terminal Tki.

In a third power strategy, the receiving terminal Tki emits a return signal with a power $P2=K/(\alpha_1 P0)$. In that way, the receiving terminal Tki can report to the selected emitting terminal Tki the ratio $(\alpha_0/\alpha_1)$ representing the SINR ratio felt for transmission from the refused emitting terminal Tki. The implementation of that third strategy can particularly, as detailed subsequently, make it possible to adapt the emission power of the selected Tki emitting terminal so as to improve the SINR ratio felt by the receiving terminal for a refused transmission of the emitting terminal Tki.

Thus, in order to make the SNR and SINR ratios accessible to an emitting terminal Tki of the group Gk, some resource elements RE of the return word of a receiving terminal Tki are managed with the first power strategy P0 and the other elements RE with the second power strategy P1. As an alternative, the three power strategies may be implemented simultaneously, which makes it necessary to form three distinct groups of resource elements RE associated with the return word.

In a fifth step E5, each emitting terminal Tki of the group Gk, transmission from which has been accepted by at least one of the receiving terminals Tki of the group, uses means M5 to verify if it fulfils the predetermined conditions for transmission before transmitting information on the network 1.

In particular, in a first sub-step E51, each emitting terminal Tki of the group Gk selected to transmit calculates through means M51 belonging to means M5:

a ratio R1 defined by the following relation:

$$R1 = \frac{N_{OK}}{N_{OK} + N_{KO}}$$

where:

$N_{OK}$ is the number of receiving terminals Tki of the group Gk that have accepted the transmission of information by the emitting terminal Tki in question (designated as acceptance terminals);

$N_{KO}$ is the number of receiving terminals Tki of the group Gk that have refused the transmission of information by the emitting terminal Tki in question (called refusing terminals) and have accepted the transmission of information from another emitting terminal Tki of said group Gk, and a ratio R2 defined by the following relation:

$$R2 = \frac{N_{OK} + N_{KO}}{N_{Total}^{DMOGroup\#k}}$$

where $N_{Total}^{DMOGroup\#k}$ designates the total number of the terminals Tki of said group Gk.

In a second sub-step E52, each selected emitting terminal compares, using means M52 belonging to the means M5, the ratios R1 and R2 thus determined, with a first threshold S1 and a second threshold S2 respectively and decides, in a last sub-step E53, that the conditions for transmission are complied with when the ratios R1 and R2 are greater than thresholds S1 and S2 respectively.

If at least one of the ratios R1 and R2 are at least equal to the corresponding threshold S1, S2, the conditions for transmission are not fulfilled.

Thus, the decision to transmit is made by a selected emitting terminal Tki of the group Gk if the number of receiving terminals Tki of its group that are accessible is sufficient by comparison with the total number of terminals of the group Gk (criterion associated with the ratio R2) and if the proportion of the receiving terminals Tki that have accepted to receive information from that emitting terminal Tki is acceptable (criterion associated with the ratio R1).

The thresholds S1 and S2 may be configured in any required manner and may particularly depend, when a priority strategy is implemented within the group Gk, on the priority of the relevant emitting terminal Tki.

As a supplement, additional conditions for transmission may be implemented. Thus, in a third sub-step E53 of the step E5, when a terminal priority strategy has been defined in the group Gk, each selected emitting terminal Tki verifies, using means M53 belonging to means M5, if out of the receiving terminals Tki that have refused to receive information from it, at least one of them has priority above that of the receiving terminals Tki that have accepted the transmission from said emitting terminal Tki in question.

If at least one refusing receiving terminal Tki has priority above that of the accepting receiving terminals Tki, the emitting terminal Tki in question decides not to transmit information through the network 1. Otherwise, it decides to emit.

Also as a supplement, in an additional sub-step E54 of step E5, if there is a plurality of emitting terminals and when a priority strategy is or is not implemented within the group Gk, each emitting terminal Tki of the relevant group Gk may, using means M54 belonging to the means M5, when the SINR ratio associated with all the authorizing receiving terminals Tki is at least equal to the threshold ratio γ:

determine the minimum SNR ratio $SNR_{min}$ associated with the authorizing receiving terminal Tki;

establish the difference a between the ratio $SNR_{min}$ and the threshold ratio γ (or $\alpha = SNR_{min} - \gamma$). That difference a represents the power margin that can be offered by the emitting terminal Tki in question to the refusing receiving terminals Tki for which the associated SINR ratio is below the threshold ratio γ. Indeed, by reducing the emission power of the relevant emitting terminal Tki by a value α dB, the SINR ratio associated with the refusing terminals Tki is improved by α dB and can thus reach the threshold ratio γ;

determine the number $N_{KO}^{Clean}$ of refusing receiving terminals Tki of the group Gk, with an associated SINR ratio below the threshold ratio γ;

calculate the new SINR ratio $SINR_{new}$ associated with each refusing receiving terminal Tki—with an associated SINR ratio below the threshold ratio γ—starting with that associated with the refusing receiving terminal Tki with the maximum SNR ratio as follows:

$$SIN\,R_{new} = SIN\,R + \alpha;$$

compare each new ratio $SINR_{new}$ calculated in that manner with the threshold ratio γ;

determine the number $N_{KO}^{saved}$ of refusing receiving terminals Tki of the group Gk with an associated new SINR ratio $SINR_{new}$ that is at least equal to the threshold ratio γ;

calculate a ratio R3 defined by the following relation:

$$R3 = \frac{N_{KO}^{Saved}}{N_{KO}^{Clean}};$$

compare the ratio R3 calculated thus with a third threshold S3; and decide that the conditions for transmission are fulfilled when the ratio R3 is greater than the third threshold S3.

If the conditions for transmission are fulfilled, each emitting terminal Tki of the group Gk, which has decided to transmit information on the network 1, can elect to implement an optimization strategy corresponding to power adaptation and/or adaptation of the MCS modulation and coding scheme.

In particular, the implementation of such an optimization strategy relies on:

the determination of the minimum SNR ratio $SNR_{min}$ associated with the authorizing receiving terminals Tki that have accepted the transmission of the emitting terminal Tki in question; and the calculation of the difference a between the ratio $SNR_{min}$ and the threshold ratio γ.

Thus, depending on whether the optimization strategy is related to a power adaptation or an adaptation of the modulation and coding scheme MCS, the difference a thus calculated is used to select a new emission power (for example in order to reduce the interference produced) and/or to select a new modulation and coding scheme (for example with less protection in order to improve the data speed).

Such an optimization strategy can for example be implemented when at least one of the refusing receiving terminals Tki of the group Gk has a corresponding expected SINR ratio that is below the threshold ratio γ.

Prior to the transmission of information on the network in a sixth step E6, each emitting transmitter Tki of the group Gk which has decided to emit, determines in an additional step the addition channel or channels ΔFj (j≠k) that it can use to transmit information on the network 1. From notifications (that may for example take the form of the reception block Rx-B) that it has received from terminals Tji that do not belong to the group Gk, each emitting terminal Tki of the group can determine the availability of the resources allocated to the groups Gj.

Thus, it may rely on the second reception block Rx-B in which the intentions of use of the channels ΔFj are reported by the emitting terminals Tji of the groups Gj of the network 1 other than the group Gk considered.

In particular, in one example of embodiment, the structure of the second reception block Rx-B comprises five sub-structures, each formed of two columns of twelve resource elements RE (or twenty-four resource elements by sub-structure corresponding to the twenty-four users of the group). In other words, a resource element RE of each sub-structure is associated with a terminal Tji of the group Gj to which the sub-structure is allocated. Thus, less than 1 ms is necessary for transmitting the second reception block Rx-B.

As an alternative, other more advanced structures of the second reception block Rx-B may be envisaged. As an example, the structure of the second reception block Rx-B may also reuse part of the structure of a signal implemented in an LTE network. The second reception block Rx-B can then use a Sounding Reference Signal (SRS) channel of the LTE network to report the intentions of use of channels by the emitting terminals Tji of the groups Gj of the network 1, other than the relevant group Gk.

When a frequency channel ΔFj—not allocated to the group Gk of an emitting terminal Tki and required by it—is indicated as unavailable in the second reception block Rx-B, the emitting terminal Tki in question will not use that channel during its transmission of information. On the other hand, when a channel ΔFj of another group Gj is available and has been requested by the emitting terminal Tki in question, that terminal will emit, in the sixth step E6, on its channel ΔFk allocated by default and on that other channel ΔFj required and available.

Besides, in order to be able to share the frequency channels between the different groups of the network, the implementation of the method described above requires the full synchronization of the different frequency channels ΔFk, ΔFj of the network 1.

Even though the method according to the invention has been described above for groups Gk with separate frequencies (one frequency channel is allocated by default to each group in the network), this invention also applies to groups Gk separated in time, that is to say where each group can successively emit in time slots allocated over a shared set of frequencies. In other words, this invention can be implemented in a radiocommunications network operating either in frequency division duplex (FDD) mode or in time division duplex (TDD) mode.

The invention claimed is:

1. A method for establishing a data transmission between a mobile transmitter terminal and at least one mobile receiver terminal of a group of mobile terminals belonging to a network, the group of mobile terminals communicating with each other in direct mode on a single frequency channel that is specifically allocated to the group, the method comprising the following steps:

(E1) for at least one mobile terminal of a particular group of mobile terminals of the network, transmitting by a first mobile terminal of a transmission request on said single frequency channel in a transmission block of a communications frame to inform other mobile terminals of said particular group of an intention to transmit information using the single frequency channel allocated to the particular group;

(E2) monitoring by at least some of the other mobile terminals in said particular group of the issuance of the transmission request;

(E3) determining by each mobile terminal of said particular group which receives the transmission request, based on at least one predefined selection strategy, if the receiving mobile terminal accepts the transmission of information by said first mobile terminal;

(E4) in case of acceptance of such transmission of information, transmitting by each receiving mobile terminal to other mobile terminals in the particular group on said single frequency channel in a first reception block of said communications frame of a return signal comprising data related to said first mobile terminal including identity;

(E5) after receiving said return signal, checking by said first mobile terminal if predetermined transmission conditions are met; and (E6) if said predetermined transmission conditions are met, transmitting by said first mobile terminal on said single frequency channel in a traffic block of said communications frame of the information to the other mobile terminals of the particular group.

2. The method according to claim 1,
wherein transmitting by the first mobile terminal of the transmission request further comprises transmitting the transmission request informing of the intention to transmit information using another single frequency channel allocated to a different group of mobile terminals;

wherein prior to step (E6) said first mobile terminal receives on said single frequency channel in a second reception block of said communications frame one or more notifications from mobile terminals belonging to the different group, from which the first mobile terminal determines the availability of resources allocated to groups other than said particular group.

3. The method according to claim 1, wherein, in said predefined selection strategy implemented at the step (E3), each receiving mobile terminal of said particular group:
determines (E31) the signal to noise ratio expected for a transmission from said first mobile terminal;
compares (E31) the determined signal to noise ratio to a first threshold ratio; and
accepts the transmission of information by said first mobile terminal if the signal to noise ratio is at least equal to said first ratio threshold ratio.

4. The method according to claim 1, wherein, during the checking step (E5), said first mobile terminal:
calculates a ratio R1 defined by the following relationship:

$$R1 = N_{OK}/(N_{OK} + N_{KO})$$

wherein:
$N_{OK}$ is the number of mobile terminals of said particular group that have accepted the transmission of information from the first mobile terminal; and
$N_{KO}$ is the number of mobile terminals of said particular group that have refused the transmission of information from the first mobile terminal and have accepted the transmission of information from other mobile terminals of said particular group;
calculates a ratio R2 defined by the following relationship:

$$R2 = (N_{OK} + N_{KO})/N_{total}$$

where $N_{total}$ is the total number of mobile terminals of said particular group;
compares the ratios R1 and R2 to a first threshold and a second threshold; and
decides that the predetermined transmission conditions are met when the ratios R1 and R2 are superior to the first and second thresholds.

5. The method according to claim 1, wherein the transmission request includes the identity of the first mobile terminal and the identity of resources allocated to other groups of said network on which the first mobile terminal wishes to transmit information.

6. The method according to claim 1, wherein:
the first mobile terminal receives data on the availability of resources allocated by default to other groups; and
in step (E6), the first mobile terminal transmits the information additionally on desired ones of the resources allocated by default to the other groups that are available.

7. The method according to claim 1, wherein when said predetermined transmission conditions are met, said first mobile terminal implements an optimization strategy corresponding to one or more of a power adjustment and an adaptation of a modulation scheme and coding.

8. The method according to claim 1, wherein, during the checking step (E5), said first mobile terminal:
calculates a ratio R defined by the following relationship:

$$R = N_{OK}/(N_{OK} + N_{KO})$$

wherein:
$N_{OK}$ is the number of mobile terminals of said particular group that have accepted the transmission of information from the first mobile terminal; and
$N_{KO}$ is the number of mobile terminals of said particular group that have refused the transmission of information from the first mobile terminal and have accepted the transmission of information from other mobile terminals of said particular group;
compares the ratio R to a threshold; and
decides not to transmit if the ratio R is not superior to the threshold.

9. The method according to claim 1, wherein, during the checking step (E5), said first mobile terminal:
calculates a ratio R defined by the following relationship:

$$R=(N_{OK}+N_{KO})/N_{total}$$

wherein:
$N_{OK}$ is the number of mobile terminals of said particular group that have accepted the transmission of information from the first mobile terminal;
$N_{KO}$ is the number of mobile terminals of said particular group that have refused the transmission of information from the first mobile terminal and have accepted the transmission of information from other mobile terminals of said particular group; and
$N_{total}$ is the total number of mobile terminals of said particular group;
compares the ratio R to a threshold; and
decides not to transmit if the ratio R is not superior to the threshold.

10. The method according to claim 1, wherein, during the checking step (E5), said first mobile terminal:
calculates a ratio R that is a function of a number of mobile terminals of said particular group that have accepted the transmission of information from the first mobile terminal and a number of mobile terminals of said particular group that have refused the transmission of information from the first mobile terminal;
compares the ratio R to a threshold; and
decides not to transmit if the ratio R is not superior to the threshold.

11. The method of claim 2, wherein step (E6) transmitting by said first mobile terminal on said single frequency channel in the traffic block of said communications frame comprises additionally transmitting on said another single frequency channel allocated to a different group of mobile terminals in the traffic block of said communications frame if said mobile terminal does not receive notifications in said second reception block from mobile terminals belonging to the different group.

12. The method according to claim 3, wherein each receiving mobile terminal further:
checks that at least one additional selection criterion is validated if more than the first mobile terminal has informed of the intention to transmit; and
accepts the transmission of information from the first mobile terminal if the signal to noise ratio is at least equal to said first threshold ratio and the additional selection criterion is validated.

13. The method according to claim 4, wherein a priority strategy for the mobile terminals in said predetermined group is defined, said first mobile terminal further:
checks whether any of the receiving mobile terminals has refused to receive transmission of information and has a higher priority than the receiving mobile terminals that have accepted the transmission of information from said first mobile terminal; and
decides that the transmission conditions are met when the receiving mobile terminals that have refused to receive transmission of information have no higher priority than the receiving mobile terminals that have accepted the transmission of information.

14. The method according to claim 12, wherein said additional selection criterion belongs to the following group of criteria:
in the case where a priority strategy of the mobile terminals is implemented in said particular group, the priority of the first mobile terminal is higher than the priority of the other mobile terminal that has informed of the intention to transmit;
the signal to noise ratio determined corresponding to the first mobile terminal is higher than the signal to noise ratio determined corresponding to the other mobile terminal that has informed of the intention to transmit.

15. The method according to claim 12, wherein, prior to step (E4), each receiving mobile terminal of said particular group that has accepted the transmission from the first mobile terminal further:
determines the signal-to-interference ratio expected for a transmission from the first mobile terminal;
compares the signal to interference ratio to a second threshold ratio; and
indicates in its feedback:
that the determined signal to interference ratio is at least equal to said second threshold ratio indicating that the transmission of information simultaneously on the single frequency channel allocated to said particular group by a mobile terminal of said particular group other than said first mobile terminal is authorized;
that the signal-to-interference ratio is less than said second threshold ratio, and that the transfer of information simultaneously on the single frequency channel allocated to said particular group by a mobile terminal of the particular group other than said first mobile terminal is refused.

\* \* \* \* \*